(12) United States Patent
Pathangay et al.

(10) Patent No.: US 10,152,639 B2
(45) Date of Patent: Dec. 11, 2018

(54) METHOD AND SYSTEM FOR IDENTIFYING A VACANT PARKING SPACE IN A PARKING LOT

(71) Applicant: WIPRO LIMITED, Bangalore (IN)

(72) Inventors: Vinod Pathangay, Bangalore (IN); Rahul Siripurapu, Bengaluru (IN)

(73) Assignee: WIPRO LIMITED, Bangalore (IN)

( * ) Notice: Subject to any disclaimer, the term of this patent is extended or adjusted under 35 U.S.C. 154(b) by 32 days.

(21) Appl. No.: 15/475,211

(22) Filed: Mar. 31, 2017

(65) Prior Publication Data

US 2018/0232584 A1 Aug. 16, 2018

(30) Foreign Application Priority Data

Feb. 16, 2017 (IN) .............................. 201741005590

(51) Int. Cl.
*G06K 9/00* (2006.01)
*G08G 1/14* (2006.01)
*G06T 7/73* (2017.01)

(52) U.S. Cl.
CPC ............ *G06K 9/00812* (2013.01); *G06T 7/74* (2017.01); *G08G 1/142* (2013.01); *G08G 1/144* (2013.01);
(Continued)

(58) Field of Classification Search
CPC .............. G06K 9/00812; G06K 9/6202; G06K 9/6269; G06K 9/00791; G06K 9/00624;
(Continued)

(56) References Cited

U.S. PATENT DOCUMENTS 8,971,581 B2   3/2015  Wu et al.
9,171,469 B2  10/2015  Gupta et al.
(Continued)

FOREIGN PATENT DOCUMENTS

WO    WO 2014/202362    12/2014

OTHER PUBLICATIONS

Catherine Wah, "Parking Space Vacancy Monitoring", 2009, 5 pages.
(Continued)

*Primary Examiner* — Jose L Couso
(74) *Attorney, Agent, or Firm* — Finnegan, Henderson, Farabow, Garrett & Dunner, LLP (57) ABSTRACT

Disclosed herein are a method and a system for identifying a vacant parking space in a parking lot. The method includes receiving, by a parking space identifier, at least one image frame from an imaging device. The method includes determining one or more bounding boxes indicative of one or more vehicles in the at least one image frame and executing vehicle classification on the detected one or more bounding boxes in the at least one image frame to determine at least one first dimension corresponding to each of the one or more vehicles in the portion of the parking lot. Further the method includes comparing at least one second dimension of space in between pairs of non-overlapping bounding boxes and a predefined threshold corresponding to the vehicle classification and determining the vacant parking space associated with the vehicle classification based on the at least one first dimension and the comparison.

9 Claims, 4 Drawing Sheets

(52) U.S. Cl.
CPC .... *G08G 1/148* (2013.01); *G06T 2207/20021* (2013.01); *G06T 2207/20081* (2013.01); *G06T 2207/30264* (2013.01)

(58) Field of Classification Search
CPC .. G06K 9/00771; G06K 2209/23; G06T 7/74; G06T 2207/20021; G06T 2207/20081; G06T 2207/30264; G06T 2207/30252; G08G 1/14–1/149; G08G 1/065; G08G 1/168; B60R 1/00; B60R 2300/806; B60W 50/14; B60W 30/06; B62D 15/02; B62D 15/027–15/0285; G05D 1/0246; G05D 1/0225; G01C 21/3685; G01C 21/20; G01C 21/3679; H04W 4/046; H04N 5/225; H04N 21/41422
See application file for complete search history.

(56) References Cited

U.S. PATENT DOCUMENTS

| | | | |
|---|---|---|---|
| 9,317,752 B2 | 4/2016 | Bulan et al. | |
| 9,363,483 B2 | 6/2016 | Bulan et al. | |
| 9,381,916 B1 | 7/2016 | Zhu et al. | |
| 9,386,302 B2 | 7/2016 | Zeng et al. | |
| 2008/0273752 A1 | 11/2008 | Zhu et al. | |
| 2012/0053833 A1 | 3/2012 | Kolodziej | |
| 2013/0258107 A1* | 10/2013 | Delibaltov | G06K 9/00785 348/148 |
| 2013/0265419 A1 | 10/2013 | Bulan et al. | |
| 2014/0266803 A1* | 9/2014 | Bulan | G06K 9/00785 340/932.2 |
| 2015/0086071 A1* | 3/2015 | Wu | G06T 15/205 382/103 |
| 2015/0110344 A1 | 4/2015 | Okumura | |
| 2015/0124093 A1 | 5/2015 | Wang et al. | |
| 2015/0138001 A1 | 5/2015 | Davies et al. | |
| 2015/0222859 A1 | 8/2015 | Schweid et al. | |
| 2015/0371541 A1* | 12/2015 | Korman | G08G 1/147 340/932.2 |
| 2016/0093214 A1 | 3/2016 | Wu et al. | |
| 2017/0213463 A1* | 7/2017 | Mizes | G08G 1/142 |
| 2018/0095474 A1* | 4/2018 | Batur | G05D 1/0246 |
| 2018/0114438 A1* | 4/2018 | Rajagopalan | G08G 1/142 |

OTHER PUBLICATIONS

Extended European Search Report issued in the European Patent Office in counterpart European Application No. 17179177.5, dated Jun. 27, 2018, 10 pages.

\* cited by examiner

METHOD AND SYSTEM FOR IDENTIFYING A VACANT PARKING SPACE IN A PARKING LOT

TECHNICAL FIELD

The present disclosure generally relates to image processing, and more particularly, to a method and a system for identifying a vacant parking space in a parking lot.

BACKGROUND

Traditionally, Parking lots in a city are regulated by road transport office of a concerned state or a municipal corporation of the city. But, regulation norms fixed by authority is causing inconvenience to common public at large. By way of example only, the regulation norms say, a user shall park a vehicle at a marked space only. Due to these norms, there is parking space crunch in peak business hours. The authority marks equal space for all the vehicles irrespective of their size. As a result, a smaller sized vehicle may occupy available marked parking space which could have been optimally utilized to accommodate other larger sized vehicle.

Presently, to identify an available free space in the parking lot, different system uses, individual sensors that are placed at each location to monitor status. Video based systems in the parking lots have to be pre-marked or calibrated manually and a decision is achieved based on how much of background is obscured.

However, conventional solutions suffer from a lack of generality and ease of deployment which is the reason why they have not been readily implemented. Also, they leave a lot of scope for error. Any of the sensors used by the conventional solutions may get blocked by a pebble, or the background may change, or some of the vehicles may blend in color of the background making it difficult to differentiate between the background and foreground.

Hence, it would be desirable to have methods and devices to address the above, mentioned drawbacks faced by the conventional solutions.

SUMMARY

In one embodiment, a method for identifying a vacant parking space in a parking lot is disclosed. The method includes receiving, by a parking space identifier, at least one image frame from an imaging device wherein the at least one image frame is associated with a portion of the parking lot. The method further includes determining one or more bounding boxes indicative of one or more vehicles in the at least one image frame. The method further includes executing vehicle classification on the detected one or more bounding boxes in the at least one image frame to determine at least one first dimension corresponding to each of the one or more vehicles in the portion of the parking lot, wherein the at least one first dimension represents a longest dimension of each of the one or more vehicles. Further the method includes comparing at least one second dimension of space in between pairs of non-overlapping bounding boxes and a predefined threshold corresponding to the vehicle classification wherein the at least one second dimension is different from the at least one first dimension. Finally, the method includes determining the vacant parking space associated with the vehicle classification based on the at least one first dimension and the comparison.

In another embodiment, a system for identifying a vacant parking space in a parking lot is disclosed. The system includes at least one processor and at least one memory device. The at least one memory device stores instructions that, when executed by the at least one processor, causes the at least one processor to perform operations comprising receiving at least one image frame from an imaging device wherein the at least one image frame is associated with a portion of the parking lot. The operations further include determining one or more bounding boxes indicative of one or more vehicles in the at least one image frame. The operations further include executing vehicle classification on the detected one or more bounding boxes in the at least one image frame to determine at least one first dimension corresponding to each of the one or more vehicles in the portion of the parking lot, wherein the at least one first dimension represents a longest dimension of each of the one or more vehicles. Further the operations include comparing at least one second dimension of space in between pairs of non-overlapping bounding boxes and a predefined threshold corresponding to the vehicle classification wherein the at least one second dimension is different from the at least one first dimension. Finally, the operations include determining the vacant parking space associated with the vehicle classification based on the at least one first dimension and the comparison.

In another embodiment, a non-transitory computer readable medium, including instructions stored thereon is disclosed. These instructions, when processed by at least one processor, causes the at least one processor to perform operations comprising receiving at least one image frame from an imaging device wherein the at least one image frame is associated with a portion of the parking lot. The operations further include determining one or more bounding boxes indicative of one or more vehicles in the at least one image frame. The operations further include executing vehicle classification on the detected one or more bounding boxes in the at least one image frame to determine at least one first dimension corresponding to each of the one or more vehicles in the portion of the parking lot, wherein the at least one first dimension represents a longest dimension of each of the one or more vehicles. Further the operations include comparing at least one second dimension of space in between pairs of non-overlapping bounding boxes and a predefined threshold corresponding to the vehicle classification wherein the at least one second dimension is different from the at least one first dimension. Finally, the operations include determining the vacant parking space associated with the vehicle classification based on the at least one first dimension and the comparison.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
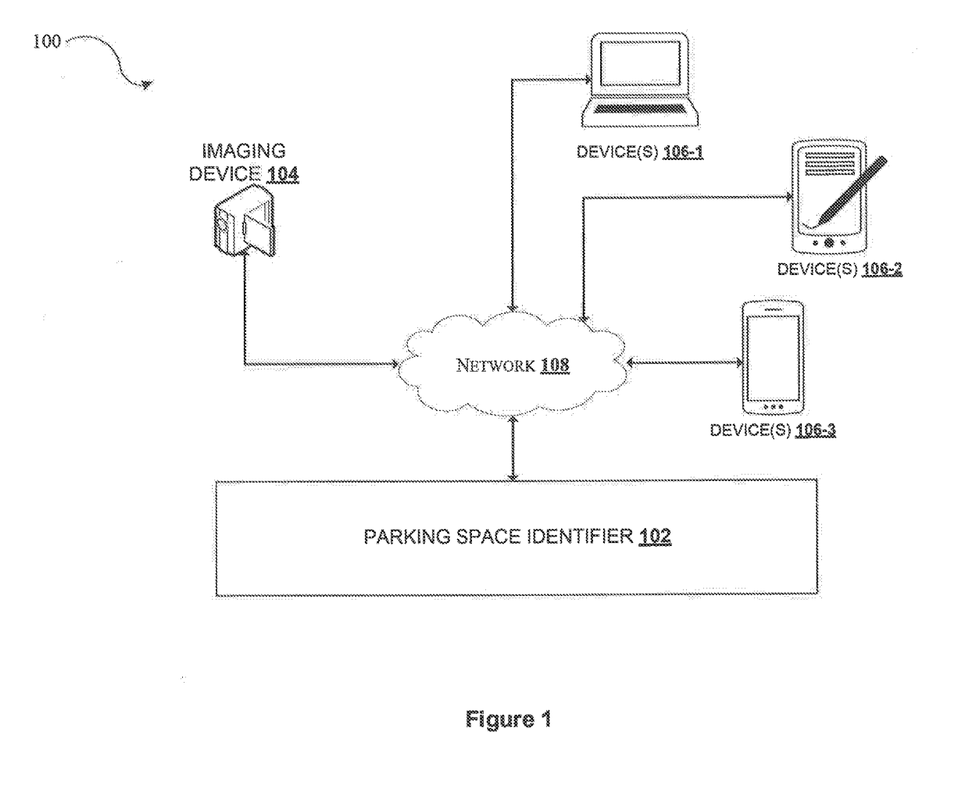
FIG. 1 illustrates an exemplary network implementation for identifying a vacant parking space in a parking lot, in accordance with some embodiments of the present subject matter.

FIG. 1 illustrates an exemplary network implementation for identifying a vacant parking space in a parking lot, in accordance with some embodiments of the present subject matter.

Referring to FIG. 1, an exemplary system 100 comprising one or more components configured for identifying a vacant parking space is disclosed. The one or more components may include a plurality of user devices 106-1, 106-2, and 106-3 (collectively referred to as user devices 106), a parking space identifier 102 (hereinafter referred to as PSI), and an imaging device 104. The above mentioned one or more components are communicatively coupled to each other via a communication network 108.

The communication network 108, may employ connection protocols including, without limitation, direct connect, Ethernet (e.g., twisted pair 10/100/1000 Base T), transmission control protocol/internet protocol (TCP/IP), token ring, IEEE 802.11a/b/g/nix, etc. The network 108 may include, without limitation, a direct interconnection, local area network (LAN), wide area network (WAN), wireless network (e.g., using Wireless Application Protocol), the Internet, etc. Using the network 108, the PSI 102 may communicate with the imaging device 104 and the user devices 106. The user devices 106 may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the PSI 102 may itself embody one or more of these devices.

The PSI 102 identifies vacant parking space within the environment 100. as illustrated and described with the examples herein, although the PSI 102 may perform other types and numbers of functions. In an example, the imaging device 104 may capture image frames of one or more vehicles parked in a parking lot. The PSI 102 may receive the image frames and based on the received image frames, vehicle classifications and vacant spaces, determine optimum vacant parking spaces for different vehicle classes.

In the context of this disclosure, the image frames may correspond to continuous frames of vehicles or the subject that are received via the imaging device 104 lens when the imaging device 104 is pointed at the one or vehicles. Thus, capturing the image frames of the one or more vehicles may not require taking a photograph of the one or more vehicles. Usually, a photograph represents a point-in-time image of the subject that is saved either on a photographic film or is stored electronically. The images frames as described in conjunction with this disclosure may represent, in some embodiments, a continuous real-time set of frames of the one or more vehicles. The image frames may not be required to be stored, or may be stored temporarily for a period of time.

Figure 2:
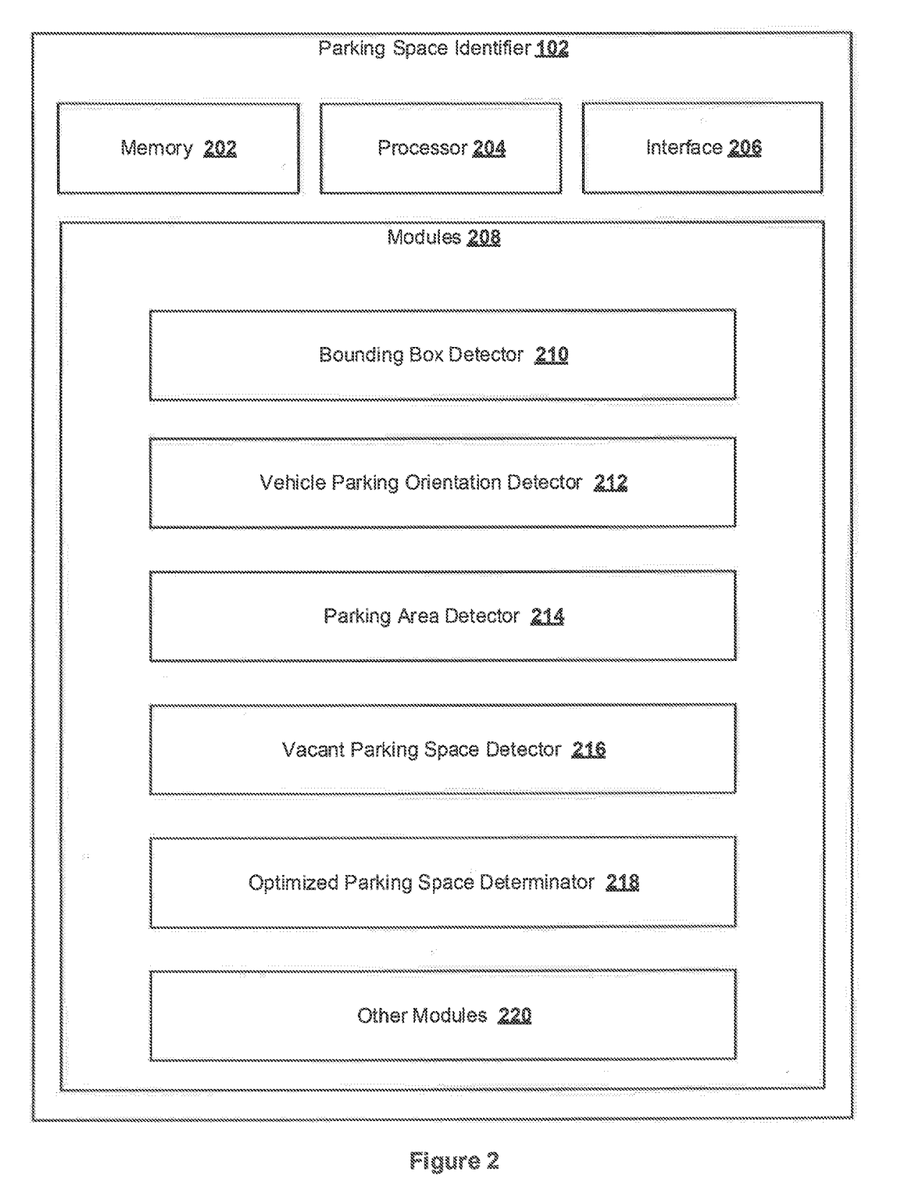
FIG. 2 illustrates a parking space identifier for identifying a vacant parking space in a parking lot, in accordance with some embodiments of the present subject matter.

The PSI 102 for identifying vacant parking spaces is explained in more detail in conjunction with FIG. 2. As shown in FIG. 2, the PSI 102, comprises of a processor 204, a memory 202 coupled to the processor 204, and interface(s) 206. The processor 204 may be implemented as one or more microprocessors, microcomputers, microcontrollers, digital signal processors, central processing units, state machines, logic circuitries, and/or any devices that manipulate signals based on operational instructions. Among other capabilities, the processor 204 is configured to fetch and execute computer-readable instructions stored in the memory 202. The memory 202 can include any non-transitory computer-readable medium known in the art including, for example, volatile memory (e.g., RAM), and/or non-volatile memory (e.g., EPROM, flash memory, etc.).

The interface(s) 206 may include a variety of software and hardware interfaces, for example, a web interface, a graphical user interface, etc., allowing the PSI 102 to interact with the user devices 106. Further, the interface(s) 206 may enable the PSI 102 respectively to communicate with other computing devices. The interface(s) 206 can facilitate multiple communications within a wide variety of networks and protocol types, including wired networks, for example LAN, cable, etc., and wireless networks such as WLAN, cellular, or satellite. The interface(s) 206 may include one or more ports for connecting a number of devices to each other or to another server.

In one embodiment, the PSI 102 includes modules 208. In one embodiment, the modules 208 may be stored within the memory 206. In one example, the modules 208, amongst other things, include routines, programs, objects, components, and data structures, which perform particular tasks or implement particular abstract data types. The modules 208 and may also be implemented as, signal processor(s), state machine(s), logic circuitries, and/or any other device or component that manipulate signals based on operational instructions. Further, the modules 208 can be implemented by one or more hardware components, by computer-readable instructions executed by a processing unit, or by a combination thereof.

In one implementation, the modules 208 further include a bounding box detector (BBD) 210, a vehicle parking orientation detector (VPOD) 212, a parking area detector (PAD) 214, a vacant parking space detector (VPSD) 216, and an optimized parking space determinator (OPSD) 218. In an example, the modules 208 may also comprise other modules 220. The other modules 220 may perform various miscellaneous functionalities of the PSI 102. It will be appreciated that such aforementioned modules may be represented as a single module or a combination of different modules.

In operations, the BBD 210 may receive one or more image frames from the imaging device 104. The BBD 210 may detect the features of one or more vehicles included in the one or more image frames in order to determine one or more bounding boxes. Examples of different kinds of vehicles may be car, bus, truck, van, etc. In another example, the vehicles may be identified based on Fast R-CNN algorithm. In some embodiments, the one or more bounding boxes may be retrieved from a database stored in the memory 202. In some embodiments, one or more bounding boxes may be traced based on various common feature point tracking algorithms used in computer vision like Scale-invariant feature transform (SIFT) or speeded up robust features (SURF).

In some embodiments, the BBD 210 may determine a vehicle classification. In an embodiment, the BBD 210, may execute vehicle classification on the detected one or more bounding boxes to determine at least one first dimension corresponding to each of the one or more vehicles in the portion of the parking lot, wherein the at least one first dimension represents a longest dimension of each of the one or more vehicles. In an example, the vehicle classifications may be bus, truck, minivan, omnibus, sedan, hatchback etc.

In some embodiments, the BBD 210 may use deep learning based generic vehicle detector algorithms, to calculate location and size of the vehicle in the image frame. The location and size of the vehicle in the image frame may be represented as V (x, y, b), signifying the location of the vehicle V, in the image frame is x and y and the size of the bounding box is b. Hence referring to the above, mentioned example, b is the pixelated longest dimension of the bounding box.

In some other embodiments, BBD 210 may calculate the pixel to distance ratio. In an example, BBD 210 may find the ratio of the longest dimension of the bounding box of a particular vehicle to the at least one first dimension of the vehicle. Referring to the above, mentioned example, the pixel to distance ratio for a vehicle V of bounding box size b may be represented as b/D(V), were the V may be the type of the vehicle and D(V) represents the at least one first dimension or the longest dimension of the vehicle V. The longest dimension may be the physical dimension of the vehicle V. In an example, the longest physical dimension of a particular type of vehicle may be fetched by the BBD 210 from a database in the memory 104.

In some embodiments, the VPOD 212 may detect the orientation in which the vehicles may be parked in the parking lot. In an example, the BBD 210, may compute vehicle parking orientation based on a comparison between an optical axis associated with the imaging device 104, and a plane perpendicular to the one or more vehicles. In an example, the optical axis may be a line passing through the center of curvature of a lens of the imaging device 104 and parallel to the axis of symmetry.

In some embodiments, accelerometer readings placed in the imaging device 104 may be used by the VPOD 212, to detect an elevation angle with respect to the road. In an example, the elevation angle may be the supplementary angle made by the optical axis with the y axis. If the angle between the optical axis and the y axis is Ø, then the elevation angle may be (180−Ø). In some examples, the direction of the road may be taken as one of the axis, and the angle of the imaging device 104, with respect of the road may be the elevation angle. The elevation angle with respect to the road, in vector notation from the readings of the accelerometers may be represented as, $a=a_z/\sqrt{a_x^2+a_y^2+a_z^2}$. The elevation angle with respect to the roads may help in determining the top and sides of the vehicles.

In some other embodiments, the VPOD 212 may compare the at least one dimension with a corresponding at least one predefined orientation threshold associated with each of the one or more bounding boxes. The VPOD 212 may then determine the vehicle parking orientation of the one or more vehicles relative to the optical axis based on the comparison.

In an example, elevation specific vehicle detector algorithms and vehicle-type classifier algorithms, as used by BBD 210 may be used to obtain pose specific bounding boxes by the VPOD 212. In an example, Fast RCNN algorithms trained with specific pretrained pose of vehicles may be used to determine vehicles and creating bounding boxes. If the longest dimension of the one or more boxes is greater than the at least one predefined orientation threshold, then the parked vehicle orientation is perpendicular to the optical axis, else parked vehicle orientation is parallel to the optical axis. In an example, the at least one predefined orientation threshold may be 90% of the longest dimension of a vehicle.

In an example, based on a trajectory density map and a vehicle speed map determined, the direction of the road may be determined by the by the PAD 214. Using the pose specific bounding box and comparing if the longest distance of the vehicle is in the direction of the road, the VPOD 212 may determine that the vehicle is parked parallel to the road, otherwise it is parked parallelly. Based on the parking of majority of the vehicles in the image frame, the VPOD 212 may determine whether the vehicles may be parked perpendicularly or parallelly.

In some embodiments, the PAD 214, may train the PSI 102 to detect a parking area. The parking area may be distinguished by the PAD 214 from a road region and a non-road region. In some embodiments, the PAD 214 may segment the at least one image frame into one or more blocks. In an example, the PAD 214 may generate a trajectory density map (TDM) for each block of the one or more image frames. The TDM may be represented as TDM (i, j). The values of i and j may represent each block. For example, if the value of i is 1 and the value of j is 2, it represents Block (1, 2) belonging to an image frame. The TDM (1, 2) is the trajectory density map for block (1, 2). In another example, in a 168 hour time window, for every traced vehicle, the value of TDM(i, j) may be incremented, if the trajectory is in block (i, j) of the image frame.

In an embodiment, if TDM (I, j) value computed by the PAD 214 is greater than a threshold value, then the block (i, j) may signify major vehicle movement. In an example, the threshold value may be a percentage of the maximum TDM value. In an example, for each block (i, j) if the TDM (i, j) value is greater than 20% of maximum TDM, then the block (i, j) may be a part of the road.

In another embodiment, for each block (i, j) if the TDM (i, j) value is zero then the block (i, j) is not a part of the road. A TDM value of zero may signify walls, trees or other regions of the image frames where vehicles cannot be found.

In some embodiments, a vehicle speed map VSM (i, j) for each block (i, j) of the image may be computed by the PAD 214. In an example, every traced vehicle, increment value of VSM (i, j) with the tracking speed (in pixels/sec) may be computed by the PAD 214. In another embodiment, for each block (i, j) if the TDM (i, j) value is non-zero and VSM (i, j) is less than a percentage of maximum VSM value, then the block may be identified to be a parking area. In an example, if the TDM (i, j) value is non-zero and the VSM (i, j) value is less than 10% of the maximum VSM value, then the block may be determined as the parking region.

After determining the parking orientation, the VPSD 216 may compare at least one second dimension of space in between pairs of non-overlapping bounding boxes and a predefined threshold corresponding to the vehicle classification, wherein the at least one second dimension is different from the at least one first dimension. In an example, the at least one second dimension may be the width of the space between two non-overlapping bounding boxes. The VPSD 216 may compare the width of the space with the predefined threshold based on vehicle classification. In an example, the predefined vehicle threshold may be the maximum width of a vehicle already classified by the BBD 210. In an example, if the at least one second dimension of the space between two non-overlapping bounding boxes is lesser than the predefined threshold, then the VPSD 216 may determine that the space can accommodate a vehicle for parking. In an example, the vacant parking space may be pixelated.

After determining the free space for parking by the VPSD 216, the OPSD 218, may determine optimized vacant parking space associated with the vehicle classification based on the first dimension and the comparison. In an example, if based on the comparison, the space is determined to be able to fit a truck, yet the at least one first dimension of the surrounding bounding boxes is that of a hatch back, then the vacant space may be determined to be for hatchback by OPSD 218.

In some embodiments, the optimized vacant parking spaces may be displayed on the user devices 106. The users may be able to park their vehicles as per the classified parking spaces.

Figure 3:
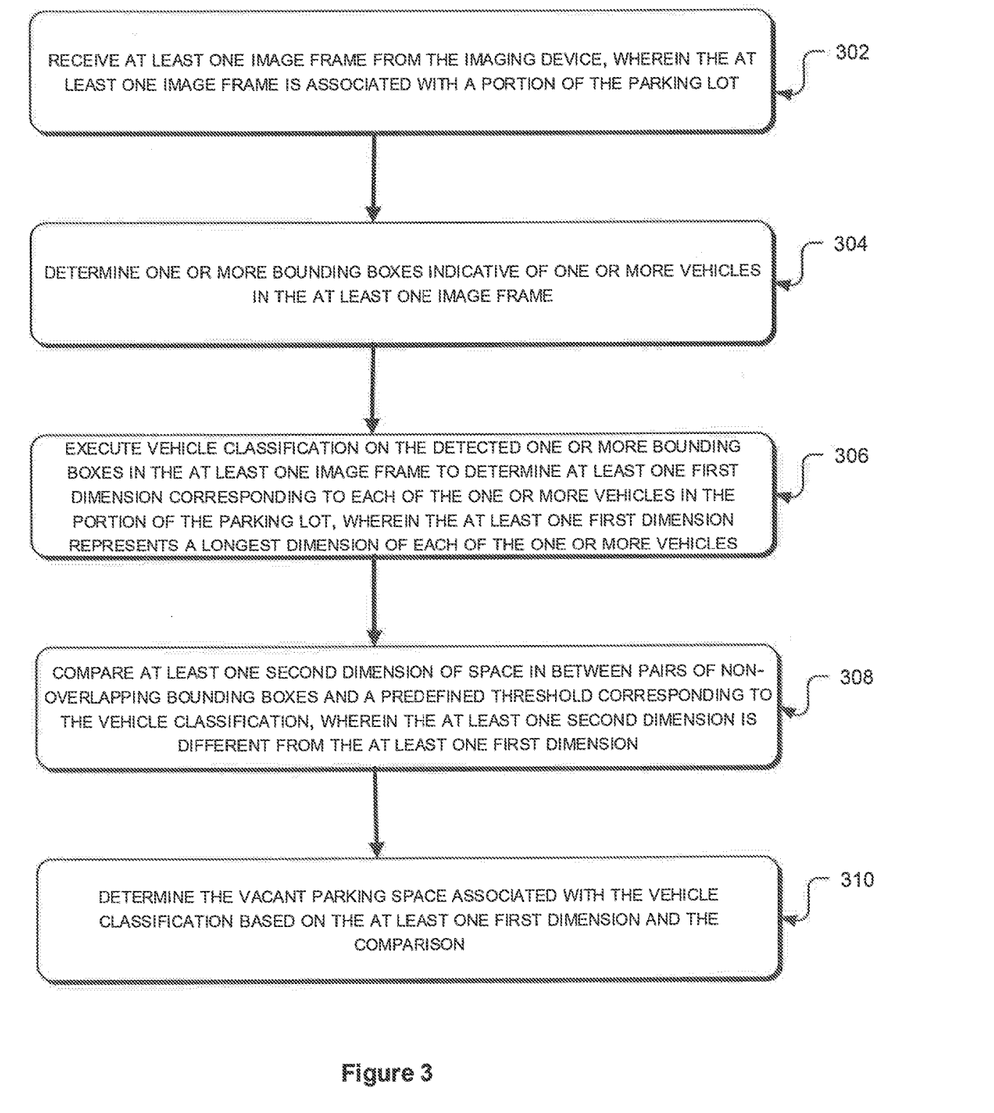
FIG. 3 illustrates an exemplary method for identifying a vacant parking space in a parking lot, in accordance with some embodiments of the present subject matter.

FIG. 3 illustrates a method for identifying a vacant parking space in a parking lot, in accordance with some embodiments of the present subject matter.

The method 300 may be described in the general context of computer executable instructions. Generally, computer executable instructions can include routines, programs, objects, components, data structures, procedures, modules, and functions, which perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternative methods. Additionally, individual blocks may be deleted from the method 300 without departing from the spirit and scope of the subject matter described herein. Furthermore, the method 300 can be implemented in any suitable hardware, software, firmware, or combination thereof.

With reference to FIG. 3, at step 302, at least one image frame may be received from the imaging device 104, wherein the at least one image frame is associated with a portion of the parking lot. A portion of the parking lot may be any part of a parking lot which may fit into an image frame and may comprise an area for parking, a road segment and other areas including walls, trees etc.

At step 304, one or more bounding boxes may be determined, which may be indicative of one or more vehicles in the at least one image frame. In one embodiment, the BBD 210, may detect one or more vehicles and the type of vehicles, based on certain vehicle detecting algorithms. In an example, the types of vehicles may be cars, trucks, minivans etc. The vehicle detection may be performed, using Fast R-CNN algorithm, the memory 202. In some embodiments, one or more bounding boxes may be traced based on various common feature point tracking algorithms used in computer vision like Scale-invariant feature transform (SIFT) or speeded up robust features (SURF).

Upon determining the bounding boxes, vehicle classification may be executed on the detected one or more bounding boxes in the at least one image frame to determine at least one first dimension corresponding to each of the one or more vehicles in the portion of the parking lot, wherein the at least one first dimension represents a longest dimension of each of the one or more vehicles. In an example, the vehicle classifications may be bus, truck, minivan, omnibus, sedan, hatchback etc.

In some embodiments, the pixel to distance ratio may be determined by the BBD 210, based on the size of the bounding at a particular place in the image frame represented in coordinate system as V (x, y, b), where b is the size of the bounding box and the actual length of the vehicle. The pixel to distance ratio may be represented as b/D(V), where b is the size or the longest dimension of the bounding box and D(V) is the at least one first dimension or the longest dimension of the vehicle type V.

In some embodiments, vehicle parking orientation may be determined based on a comparison between an optical axis associated with the imaging device 104 and a plane perpendicular to the one or more vehicles. In an example, the optical axis may be a line passing through the center of curvature of a lens of the imaging device 104 and parallel to the axis of symmetry.

In some embodiments, an elevation angle with respect to the road may be determined as described with reference to FIG. 2 by the VPOD 212. The elevation angle with respect to the road, in vector notation from the readings of the accelerometers may be represented as, $a=a_z/\sqrt{(a_x^2+a_y^2+a_z^2)}$. The elevation angle with respect to the roads may help in determining the top and sides of the vehicles.

In some other embodiments, the at least one dimension may be compared with a corresponding at least one predefined orientation threshold associated with each of the one or more bounding boxes. The VPOD 212 may then determine the vehicle parking orientation of the one or more vehicles relative to the optical axis based on the comparison. In an example, the at least one predefined orientation threshold may be 90% of the longest dimension of a vehicle. In some embodiments, pose specific bounding boxes may be determined by the VPOD 212. In an example, If the longest dimension of the one or more boxes is greater than the at least one predefined orientation threshold, then the parked vehicle orientation is perpendicular to the optical axis, else parked vehicle orientation is parallel to the optical axis.

In a few other embodiments, trajectory density map and a vehicle speed map determined for the one or more vehicles to determine the direction of the road. Based on the direction of the bounding boxes the direction and orientation of parking may be determined as referred in FIG. 2.

In some embodiments, parking area may be detected by the PSI 102. The PAD 214 may segment the at least one image frame into one or more blocks. After segmenting the trajectory density map (TDM) may be determined for the one or more vehicles detected in each of the one or more blocks. The parking area may be detected by the PAD 214, based on the TDM and a vehicle speed map (VSM) for the one or more vehicles detected in each of the one or more blocks.

In an example, for each block (i, j) if the TDM (i, j) value is greater than 20% of maximum TDM, then the block (i, j) may be a part of the road. In another example, if the TDM value for a block is zero, then it may signify walls, trees or other regions of the image frames where vehicles cannot be found. In a further example, if the TDM (i, j) value is non-zero and the VSM (i, j) value is less than 10% of the maximum VSM value, then the block may be determined as the parking region.

Upon determining the parking orientation, at step 308, at least one second dimension of space in between pairs of non-overlapping bounding boxes may be compared with a predefined threshold corresponding to the vehicle classification, wherein the at least one second dimension is different from the at least one first dimension. In an example, the at least one second dimension may be the width of the space between two overlapping bounding boxes. A predefined threshold may be the width associated with a vehicle classification. The comparison may signify that space for a car may be present. In an example, the threshold may be set as the width of a hatch back car.

At step 310, the vacant parking space associated with the vehicle classification may be determined based on the at least one first dimension and the comparison. In an example, if based on the comparison, the space is determined to be able to fit a truck, yet the at least one first dimension of the surrounding bounding boxes is that of a hatch back, then the vacant space may be determined to be for hatchback by OPSD 218.

Other embodiments of the present disclosure will be apparent to those skilled in the art from consideration of the specification and practice of the embodiments disclosed herein. It is intended that the specification and examples be considered as exemplary only, with a true scope and spirit of the disclosure being indicated by the following claims.

Figure 4:
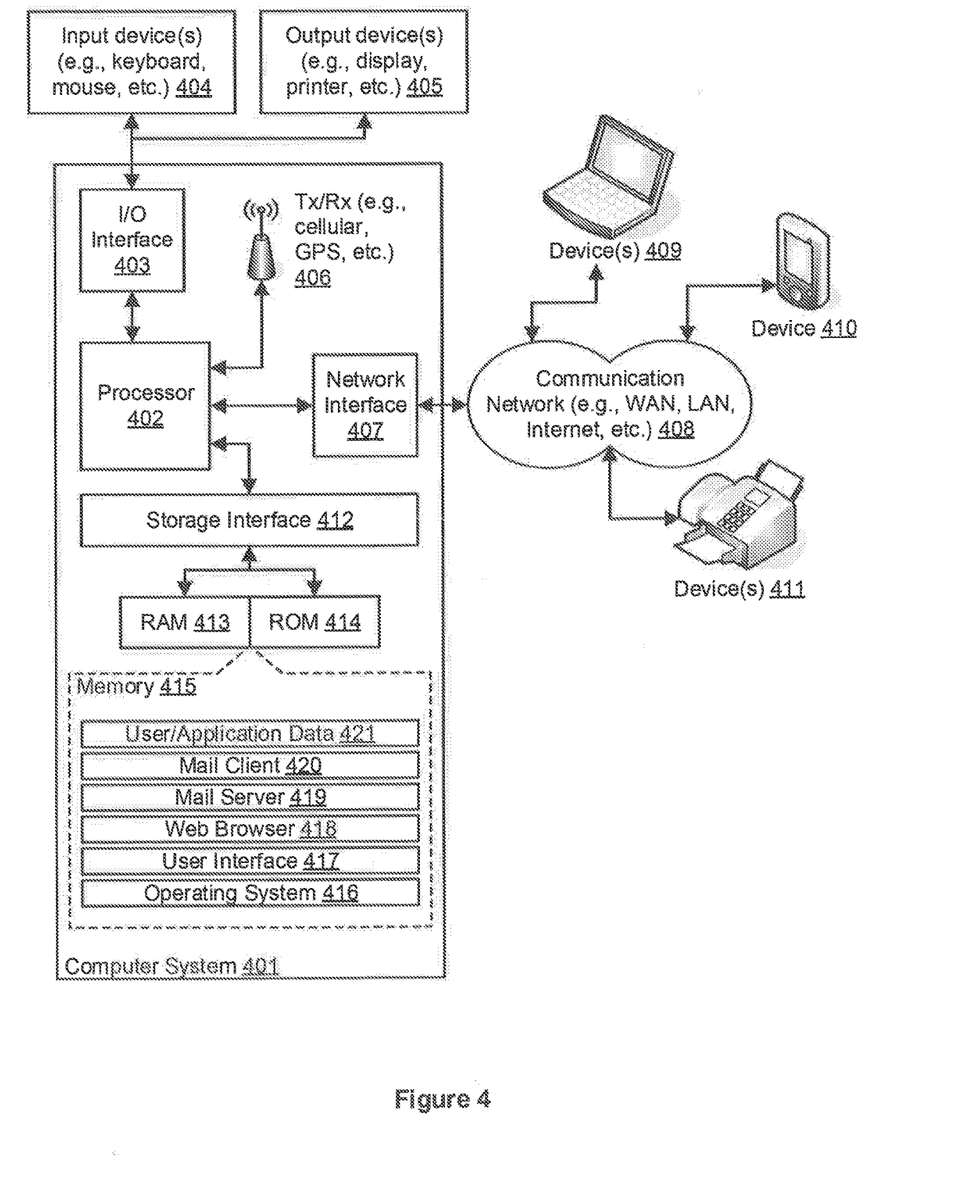
FIG. 4, is a block diagram of an exemplary computer system for implementing embodiments consistent with the present disclosure.

The advantages of the present invention may be the ability to work in any kind of ad-hoc parking area, and adapt to the environment and usage preferences over time Computer System FIG. 4, is a block diagram of an exemplary computer system for implementing embodiments consistent with the present disclosure. Variations of computer system 401 may be used for implementing Emergency Gateway System. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 508, the computer system 401 may communicate with devices 410, 411, and 412. These devices may include, without limitation, personal include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., Proximity matrix 216, Peer Device Matrix 218 and 220) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described method and system for identifying a vacant parking space in a parking lot. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for identifying a vacant parking space in a parking area, the method comprising:
   receiving, by a parking space identifier, at least one image frame from an imaging device, wherein the at least one image frame is associated with a portion of the parking area, and wherein the parking space identifier is pre-trained to detect the parking area by:
   segmenting the at least one image frame into one or more blocks;
   determining trajectory density map (TDM) for one or more vehicles detected in each of the one or more blocks; and
   detecting the parking area based on the TDM and a vehicle speed map (VSM) for the one or more vehicles detected in each of the one or more blocks;
   determining, by the parking space identifier, one or more bounding boxes indicative of the one or more vehicles in the at least one image frame;
   executing, by the parking space identifier, vehicle classification on the detected one or more bounding boxes in the at least one image frame to determine at least one first dimension corresponding to each of the one or more vehicles in the portion of the parking area, wherein the at least one first dimension represents a longest dimension of each of the one or more vehicles;
   comparing, by the parking space identifier, at least one second dimension of space in between pairs of non-overlapping bounding boxes and a predefined threshold corresponding to the vehicle classification, wherein the at least one second dimension is different from the at least one first dimension; and determining, by the parking space identifier, the vacant parking space associated with the vehicle classification based on the at least one first dimension and the comparison.

2. The method of claim 1, further comprises computing vehicle parking orientation based on a comparison between an optical axis associated with the imaging device and a plane perpendicular to the one or more vehicles.

3. The method of claim 2, wherein determining the vehicle parking orientation comprises:
comparing the at least one first dimension with a corresponding at least one predefined orientation threshold associated with each of the one or more bounding boxes; and
determining the vehicle parking orientation of the one or more vehicles relative to the optic axis based on the comparison.

4. A system for identifying a vacant parking space in a parking area, comprising:
at least one processor;
an imaging device; and
a memory, communicatively coupled to the at least one processor, wherein the memory stores processor-executable instructions, which on execution, causes the at least one processor to:
receive at least one image frame from the imaging device, wherein the at least one image frame is associated with a portion of the parking area, and wherein the parking area is detected by:
segmenting the at least one image frame into one or more blocks;
determining trajectory density map (TDM) for one or more vehicles detected in each of the one or more blocks; and
detecting the parking area based on the TDM and a vehicle speed map (VSM) for the one or more vehicles detected in each of the one or more blocks;
determine one or more bounding boxes indicative of the one or more vehicles in the at least one image frame;
execute vehicle classification on the detected one or more bounding boxes in the at least one image frame to determine at least one first dimension corresponding to each of the one or more vehicles in the portion of the parking area, wherein the at least one first dimension represents a longest dimension of each of the one or more vehicles;
compare at least one second dimension of space in between pairs of non-overlapping bounding boxes and a predefined threshold corresponding to the vehicle classification, wherein the at least one second dimension is different from the at least one first dimension; and
determine the vacant parking space associated with the vehicle classification based on the at least one first dimension and the comparison.

5. The system as claimed in claim 4, further comprises computing vehicle parking orientation based on a comparison between an optical axis associated with the imaging device and a plane perpendicular to the one or more vehicles.

6. The system as claimed in claim 5, wherein determining the vehicle parking orientation comprises:

comparing the at least one first dimension with a corresponding at least one predefined orientation threshold associated with each of the one or more bounding boxes; and
determining the vehicle parking orientation of the one or more vehicles relative to the optic axis based on the comparison.

7. A non-transitory computer-readable medium storing instructions for identifying a vacant parking space in a parking area, wherein upon execution of the instructions by one or more processors, the one or more processors perform operations comprising:
receiving at least one image frame from the imaging device, wherein the at least one image frame is associated with a portion of the parking area, and wherein the parking area is detected by:
segmenting the at least one image frame into one or more blocks;
determining trajectory density map (TDM) for one or more vehicles detected in each of the one or more blocks; and
detecting the parking area based on the TDM and a vehicle speed map (VSM) for the one or more vehicles detected in each of the one or more blocks;
determining one or more bounding boxes indicative of the one or more vehicles in the at least one image frame;
executing vehicle classification on the detected one or more bounding boxes in the at least one image frame to determine at least one first dimension corresponding to each of the one or more vehicles in the portion of the parking area, wherein the at least one first dimension represents a longest dimension of each of the one or more vehicles;
comparing at least one second dimension of space in between pairs of non-overlapping bounding boxes and a predefined threshold corresponding to the vehicle classification, wherein the at least one second dimension is different from the at least one first dimension; and
determining the vacant parking space associated with the vehicle classification based on the at least one first dimension and the comparison.

8. The medium as claimed in claim 7, further comprises computing vehicle parking orientation based on a comparison between an optical axis associated with the imaging device and a plane perpendicular to the one or more vehicles.

9. The medium as claimed in claim 8, wherein determining the vehicle parking orientation comprises:
comparing the at least one first dimension with a corresponding at least one predefined orientation threshold associated with each of the one or more bounding boxes; and
determining the vehicle parking orientation of the one or more vehicles relative to the optic axis based on the comparison.

* * * * *